Inventors
Howard Urban Taylor
Stanley Arnold Long
By Pendleton, Neuman,
Seibold & Williams
Attorneys

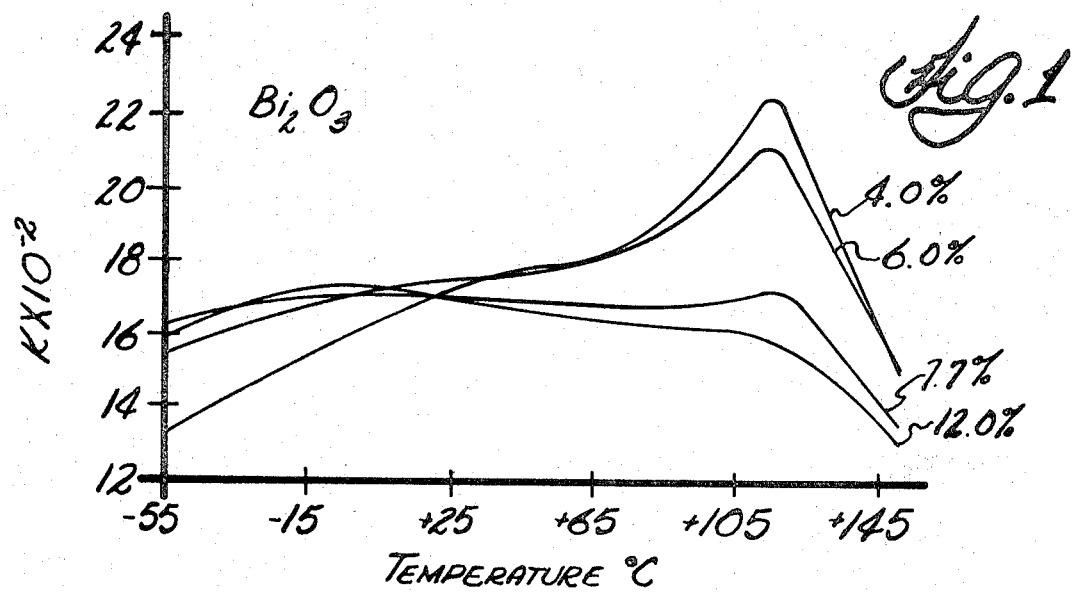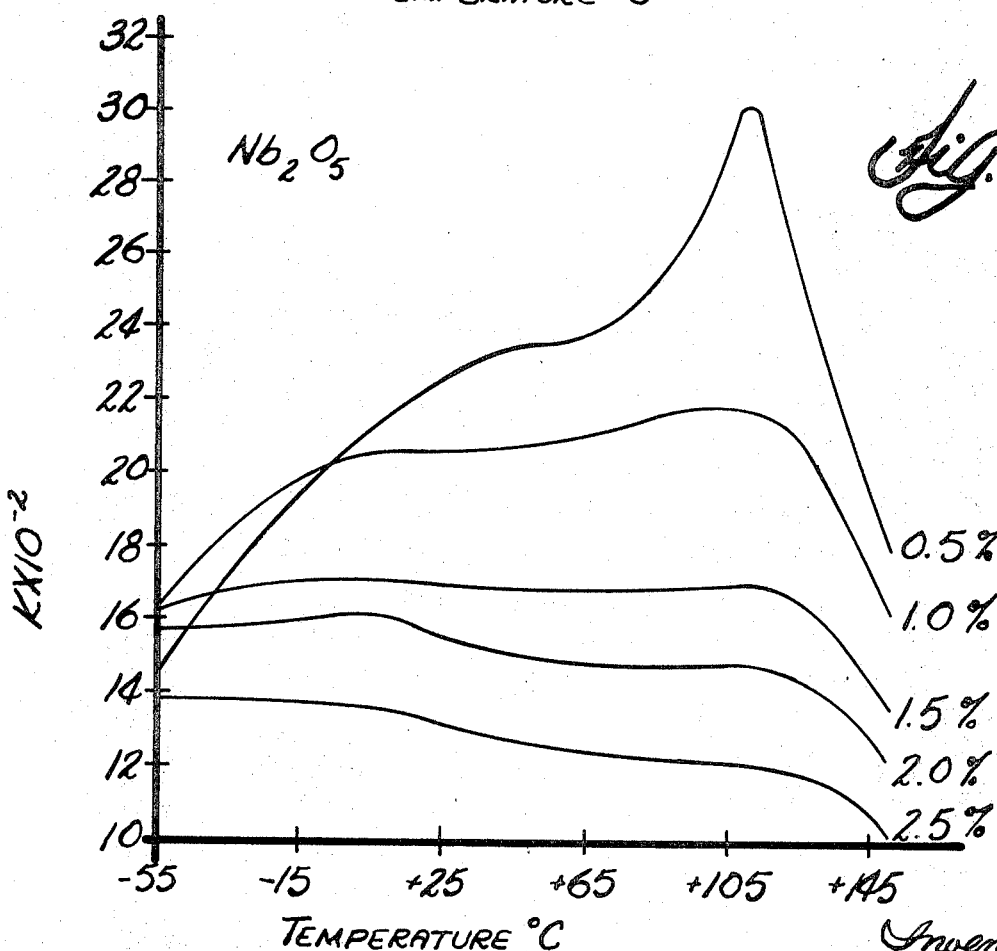

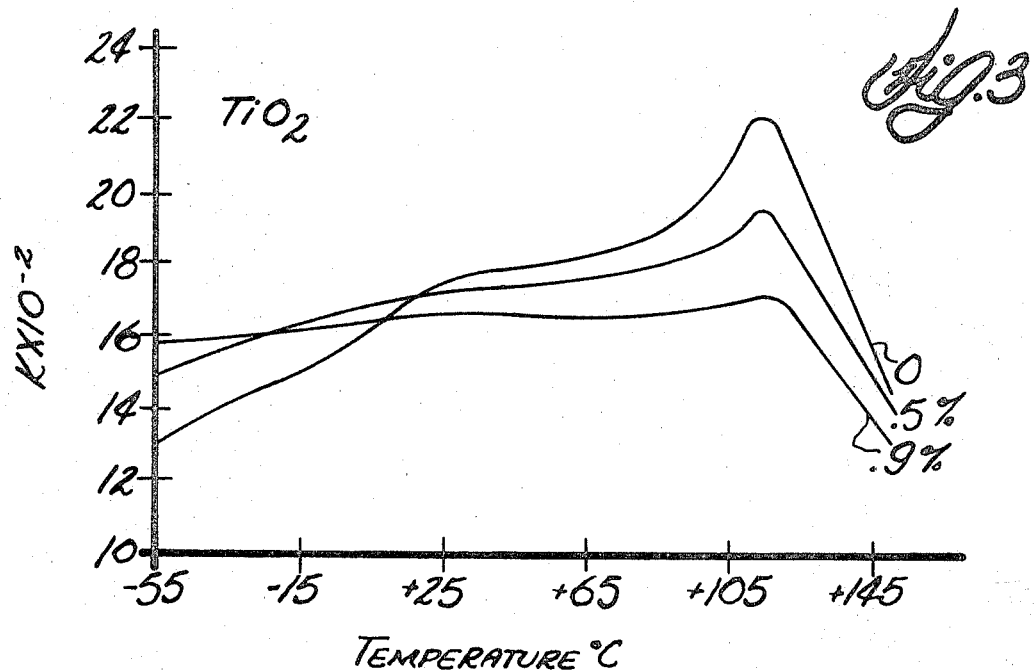
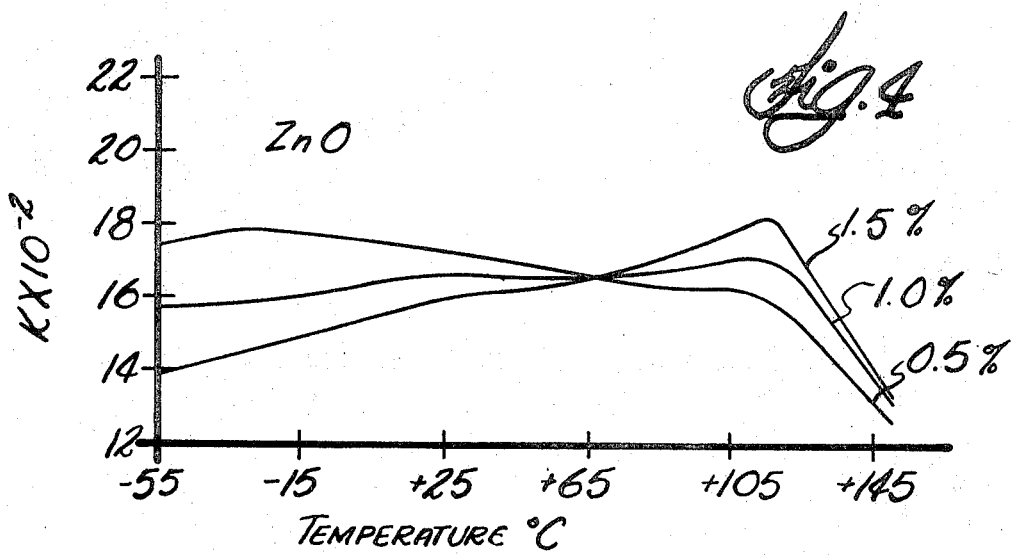

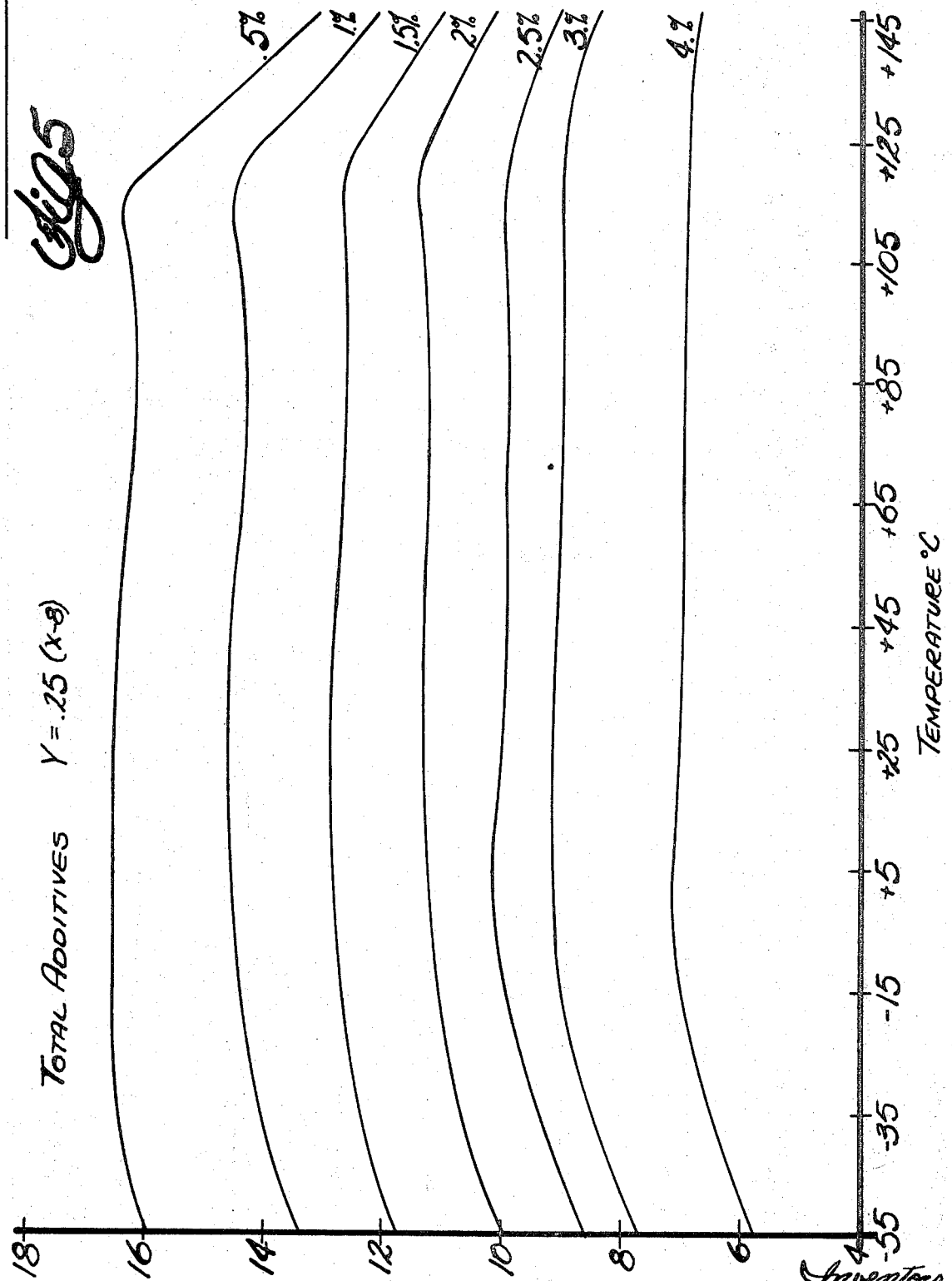

United States Patent Office 3,529,978
Patented Sept. 22, 1970

3,529,978
GENERAL PURPOSE BaTiO₃ CERAMIC
DIELECTRIC COMPOSITIONS
Howard Urban Taylor, Thiensville, and Stanley Arnold Long, Mequon, Wis., assignors to Globe-Union Inc., Milwaukee, Wis., a corporation of Delaware
Continuation of application Ser. No. 490,375, Sept. 27, 1965. This application Sept. 23, 1969, Ser. No. 860,472
Int. Cl. C04b 33/00
U.S. Cl. 106—39
9 Claims

ABSTRACT OF THE DISCLOSURE

An improved ceramic dielectric composition which is made up essentially of barium titanate, $BaTiO_3$, in which the temperature coefficient and processing characteristics are greatly enhanced by the co-ordinated additions of a minor amount of a negative additive material such as $Bi_3NbTiO_9$, $CaBi_2Nb_2O_9$, $SrBi_2Nb_2O_9$, $BaBi_2Nb_2O_9$, $$PbBi_2Nb_2O_9$$

$KBi_5Nb_4O_{18}$, $NaBi_5Nb_4O_{18}$, and $CdBi_2Nb_2O_9$, as well as $SrBi_2Ta_2O_9$, $Bi_3NbSnO_9$, $Sb_3NbTiO_9$, and $Bi_3NbZrO_9$, and a positive additive material such as ZnO or MgO, the negative additive material producing a clockwise rotation of the temperature-dielectric constant curve and the positive additive material producing a counterclockwise rotation of that characeteristic curve, the combination producing a substantially flat curve which is relatively independent of small variations in processing conditions.

---

This is a continuation of application Ser. No. 490,375, filed Sept. 27, 1965, and now abandoned.

This invention relates to ceramic dielectric compositions and more particularly to improved ceramic compositions especially adapted for use as the dielectric in a capacitor.

The compositions constituted in accordance with this invention exhibit a high dielectric constant and relatively constant dielectric characteristics for variations in ambient temperature.

It has been known for many years that advantageous capacitors can be constructed employing barium titanate as the dielectric material. Barium titanates exhibit a high dielectric constant with relatively low losses. However, the characteristics of barium titanates exhibit a substantial dependence upon ambient temperature and, specifically, a substantial variation in dielectric constant is experienced with variations in temperature. Techniques have been developed for minimizing the effect of temperature upon the dielectric constant of barium titanate dielectrics. Various additives have been found which tend to flatten the characteristic curve of dielectric constant versus ambient temperature. Also, techniques have been employed by which different titanate solid solutions are mixed together in predetermined quantities, each of the solid solutions having a somewhat different Curie point. Thus, the peaks in the curve of dielectric constants as plotted against temperature are distributed in a manner which tends to flatten the curve. However, all of the known techniques substantially lower the dielectric constants of the compounded materials and diminish their usefulness.

One particular set of additives for a barium titanate dielectric is suggested in United States Letters Patent No. 2,992,929 issued to R. Clement et al. on July 18, 1961. In accordance with that patent additives having the general chemical formula:

$$n(A_xBi_yB_2O_9) \quad (1)$$

provide a barium titanate dielectric having relatively minor variations in dielectric constant where A indicates one or several elements taken from the following group:

Bi, Ba, Sr, Ca, Pb, Na, K, Cd where the element B may be one or several of the elements taken from the group:

Ti, Nb, Ta where $n$ is an integer; $x+y=3$; and the weight of the additives is in the range of 0.5–50% of the total weight of the ceramic mixture.

It has been found that similar dielectric properties may be attained with additives corresponding to Formula 1 other than those taught by Clement et al. Specifically it has been found that Sb may be substituted for the Bi of Formula 1 and, therefore, the term $Bi_y$ in Formula 1 could be expressed as $C_y$ where the element C is either Bi or Sb. Also, Zr and Sn may be included within group B. While the Clement et al. patent requires that the additives be employed as compounds having the specific stoichiometric relationship set forth by Formula 1, it has been found that this relationship is not required. Furthermore, constituent oxides or oxide-forming compounds may be contributed to the mixture without having been previously reacted to form a compound. However, products utilizing the foregoing additives, whether added in accordance with the Formula 1 or departing therefrom, have exhibited parameters substantially dependent upon the temperature at which the product is fired during manufacture. Also, such compounds fail to optimize control of dielectric constant and temperature stability.

It is, therefore, one principal object of this invention to provide an improved ceramic composition for use as a dielectric wherein the dielectric constant thereof is high and approximately constant for variations in ambient temperature over a wide useful range.

It is another principal object of this invention to provide a temperature stable barium titanate body in which the dielectric constant may be controlled and adjusted.

It is another object of this invention to provide general purpose dielectric compositions having optimum temperature-stable dielectric constants in excess of about 1000 as distinguished from temperature compensating compositions having dielectric constants in the range of about 50 to 100.

It is still another object of this invention to provide a family of temperature-stable dielectric bodies having controllable dielectric constant levels in the range of about 300 to 2500.

It is another object of this invention to provide dielectric compositions which will have substantially the same dielectric constant and the same relationship of dielectric constant to temperature for varying conditions of manufacture.

In particular, it is an object of this invention to provide dielectric compositions which will have substantially the same dielectric constant and temperature characteristics irrespective of the firing temperature and time over specified ranges.

It is a further object of this invention to provide a dielectric composition having characteristics which are predictable and reproduceable within erasonable tolerances in manufacturing processes.

Further and additional objects of this invention will become manifest from this description, the accompanying drawings and the appended claims.

In one preferred form of this invention, a dielectric composition is provided composed primarily of barium titanate with additions of bismuth trioxide ($Bi_2O_3$), niobium pentoxide ($Nb_2O_5$), titanium dioxide ($TiO_2$), any of the foregoing sometimes being referred to herein for purposes of definition as "negative" additives, and zinc oxide (ZnO), sometimes being referred to herein as a "positive" additive. The preferred formulation, by weight of the composition is as follows:

TABLE VI

| | Percent |
|---|---|
| Barium titanate ($BaTiO_3$) | 88.9 |
| Bismuth trioxide ($Bi_2O_3$) | 7.7 |
| Niobium pentoxide ($Nb_2O_5$) | 1.5 |
| Titanium dioxide ($TiO_2$) | 0.9 |
| Zinc oxide (ZnO) | 1.0 |

The materials are in comminuted form having an average grain size of less than 5 microns and may be initially formed with an organic binder. When a composition constructed in accordance with the foregoing formulation is fired at approximately 2200–2300° F. for about one hour in accordance with conventional practice, a product results having a desirable flat temperature characteristic, a dielectric constant in the order of 1700 within the temperature range of −55 to +125° C. and a high degree of reproduceability in the presence of variations within a specified range in manufacturing conditions.

Reference will now be made to the accompanying drawings wherein:

FIG. 1 is a chart illustrating the effect of variations in $Bi_2O_3$ in one embodiment of this invention;

FIG. 2 is a chart illustrating the effect of varying the amount of $Nb_2O_5$ in the composition of FIG. 1;

FIG. 3 is a chart illustrating the effect of varying the amount of $TiO_2$ in the composition of FIGS. 1 and 2;

FIG. 4 is a chart illustrating the effect of varying the amount of ZnO in the composition charted in FIGS. 1, 2 and 3;

FIG. 5 is a chart illustrating the effect on dielectric constant and temperature characteristics of varying the total amount of additives in another embodiment of the invention.

Figure 6:
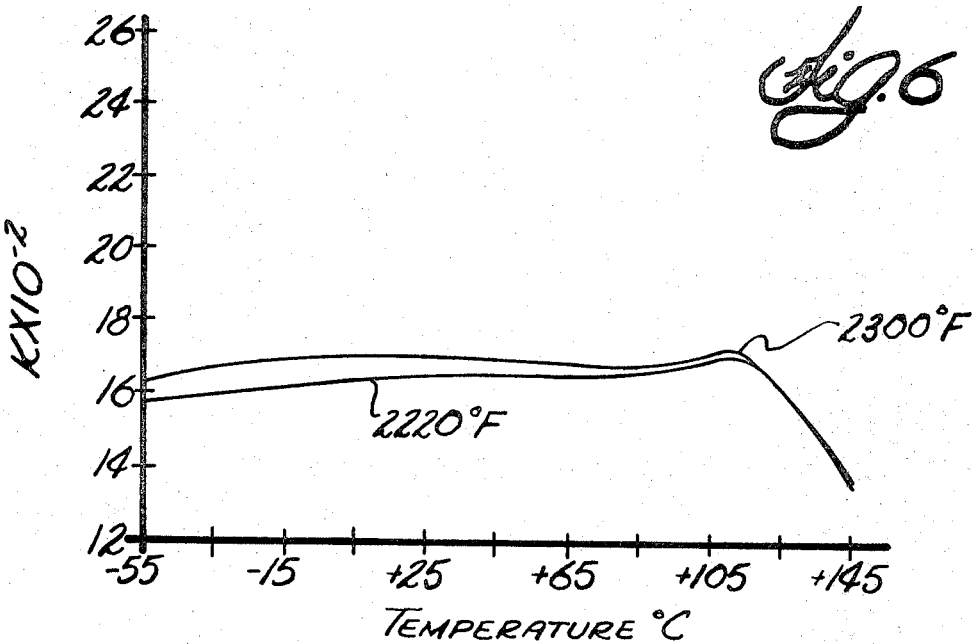
FIG. 6 is a chart illustrating the effect of variations in fiting temperature upon the electrical characteristics of a given ceramic composition constructed in accordance with this invention.

It has been discovered that additives such as the additives recommended in Clement et al. Pat. No. 2,992,929, namely, $Bi_3NbTiO_9$, $CaBi_2Nb_2O_9$, $SrBi_2Nb_2O_9$, $BaBi_2Nb_2O_9$, $PbBi_2Nb_2O_9$, $KBi_5Nb_4O_{18}$; $NaBi_5Nb_4O_{18}$, and $CdBi_2Nb_2O_9$, as well as $SrBi_2Ta_2O_9$, $Bi_3NbSnO_9$, $Sb_3NbTiO_9$, and $Bi_3NbZrO_9$, whether added as compounds or as the constituent oxides, produce a similar effect upon the temperature characteristics of barium titanate. In the foregoing examples in general Sb may be substituted for Bi, Ta may be substituted for Nb and Zr or Sn may be substituted for Ti. In addition to the foregoing, similar desirable negative additives are zirconates, titanates and stannates of bismuth. Also, the approximate molecular equivalents of the foregoing may be added as oxides, carbonates, nitrates or oxalates of the constituents.

Specifically, all of the foregoing additives as well as other additives generally fitting Formula 1 above tend to maintain or raise the dielectric constant at the lower operating temperatures in the range of the lower Curie point (i.e., around +10° C.). Furthermore, all of these additives tend to lower the dielectric constant at the upper Curie point of barium titanate (i.e., about 120° C.). Thus, there is a tendency for all of these additives to flatten the characteristic temperature curve for barium titanate and to change its average slope to a less positive value. For this reason the designation "negative additive" is employed. Furthermore, the addition of such materials tend to lower the dielectric constant in a direct relationship to the amount of additives.

It has been discovered that certain additives including the oxide of zinc (ZnO) and the oxide of magnesium (MgO) produce effects upon the temperature characteristics of the dielectric compositions opposite those set forth above. Thus, the addition of ZnO and MgO tends to raise the peak in the dielectric constant curve at +120° C. and depress it at +10° C. For this reason the designation "positive additive" is employed for members of this group. In accordance with this invention, a controlled ratio of one or more of the additives taken from the negative group along with one or more of the oxides taken from the positive group results in a composition having optimum temperature characteristics wherein the dielectric constant can be determined by the total amount of additives from both groups. Moreover, it has been discovered that especially the additive ZnO results in compositions having very similar electrical characteristics irrespective of variations within a prescribed range in the manufacturing parameters.

It has been discovered that optimum temperature characteristics in a barium titanate dielectric composition can be obtained with predictable manufacturing parameters if the ratio of additive is maintained in accordance with a predetermined formula. In a preferred embodiment this ratio is maintained between approximately the following relationships:

$$y = 0.25(x-8) \qquad (2)$$

$$y = 0.5(x-8) \qquad (3)$$

where $y$ is the percentage of ZnO and $x$ is the sum of the percentages of $Bi_2O_3$, $Nb_2O_5$ and $TiO_2$ which are added in amounts corresponding to the formula $Bi_3NbTiO_9$. For the MgO additive approximately one-half of this amount gives optimum results. The total amount of additives, when maintained approximately in the balance indicated by Formulae 2–3 set forth above, will determine the dielectric constant of the material. Furthermore, the characteristics are relatively immune to substantial variations in firing temperature.

The curves shown in the drawings illustrate certain effects of variations in the additives described above. FIG. 1 illustrates the temperature characteristics of dielectric bodies constructed in accordance with this invention and having the following composition:

TABLE I

| | Percent |
|---|---|
| Barium titanate ($BaTiO_3$) | 92.6–84.6 |
| Bismuth trioxide ($Bi_2O_3$) | 4–12 |
| Niobium pentoxide ($Nb_2O_5$) | 1.5 |
| Titanium dioxide ($TiO_2$) | .9 |
| Zinc oxide (ZnO) | 1.0 |

In this composition, the amount of $Bi_2O_3$ is varied within the range of 4–12% producing the family of curves shown in FIG. 1. The curve 7.7 illustrates the optimum curve and represents the characteristics of a body constructed in accordance with the formulation (3). It can be seen that a greater amount of $Bi_2O_3$ depresses the Curie point at about +120° C. and the curve in that region. Conversely reducing the amount of $Bi_2O_3$ results in a substantial peak at about the +120° C. point while depressing the curve in the lower temperature region.

A similar family of ceramic bodies was constructed with varying amounts of $Nb_2O_5$ according to the following formula:

TABLE II

| | Percent |
|---|---|
| Barium titanate ($BaTiO_3$) | 89.9–87.9 |
| Bismuth trioxide ($Bi_2O_3$) | 7.7 |
| Niobium pentoxide ($Nb_2O_5$) | 0.5–2.5 |
| Titanium dioxide ($TiO_2$) | .9 |
| Zinc oxide (ZnO) | 1.0 |

This family of dielectric bodies had temperature characteristics as illustrated in FIG. 2. There it can be seen that the optimum percentage of $Nb_2O_5$, namely, 1.5%, produced a substantially flat dielectric constant curve at approximately a dielectric constant of 1700. Increasing the amount of $Nb_2O_5$ depressed the curve especially at the higher temperature levels while decreasing the amount of $Nb_2O_5$ produced a substantial peak in dielectric constant at approximately +120° C.

In FIG. 3 the temperature characteristics of a family of dielectric bodies similar to those illustrated in FIGS. 1 and 2 are shown wherein the amount of $TiO_2$ is varied. The bodies have the following formulation:

TABLE III

| | Percent |
|---|---|
| Barium titanate ($BaTiO_3$) | 89.8–88.9 |
| Bismuth trioxide ($Bi_2O_3$) | 7.7 |
| Niobium pentoxide ($Nb_2O_5$) | 1.5 |
| Titanium dioxide ($TiO_2$) | 0–0.9 |
| Zinc oxide (ZnO) | 1.0 |

It is apparent that for the optimum addition of $TiO_2$, namely, .9%, the same characteristic curve as illustrated in FIGS. 1 and 2 is produced. Reducing the amount of $TiO_2$ to 0.5% or to zero results in the curves illustrated in FIG. 3 wherein a substantial peak appears at the 120° C. region. Increasing the amount will produce an opposite effect.

FIG. 4 illustrates the same basic composition constructed in accordance with the formulation (3) with variations in the amount of ZnO in accordance with the following formulation:

TABLE IV

| | Percent |
|---|---|
| Barium titanate ($BaTiO_3$) | 89.4–88.4 |
| Bismuth trioxide ($Bi_2O_3$) | 7.7 |
| Niobium pentoxide ($Nb_2O_5$) | 1.5 |
| Titanium dioxide ($TiO_2$) | 0.9 |
| Zinc oxide (ZnO) | 0.5–1.5 |

The optimum amount is shown in the 1.0% curve and it can be seen that decreasing the amount of ZnO to 0.5% depresses the curve in the 120° C. region as illustrated, while increasing the amount of ZnO to 1.5% produces a substantial peak at the 120° C. level and a depressed characteristic at the lower temperatures.

It has been discovered that some compensation can be obtained for variations from the optimum formulation set forth above. As indicated, when the optimum formulation according to Formula 3 is employed, the temperature characteristics and dielectric constants are highly independent of firing temperature over a substantial range. In the preferred embodiment this range is in excess of 100° F. However, when employing the formulation of Formula 3, somewhat elevated temperatures, in the order of 2300° F., are preferred. When the material is compounded according to Formula 2, the reduced amount of ZnO permits somewhat lower firing temperatures with a somewhat restricted tolerance.

If the formulation is further varied, some compensation can be obtained by accurately controlling manufacturing conditions and particularly firing temperature. For example, it has been found that the following formulation produces a desirable dielectric composition provided that the firing temperature is raised appropriately:

TABLE VII

| | Percent |
|---|---|
| Barium titanate ($BaTiO_3$) | 90.5 |
| Bismuth trioxide ($Bi_2O_3$) | 7.3 |
| Niobium pentoxide ($Nb_2O_5$) | 1.4 |
| Titanium oxide ($TiO_2$) | .8 |
| Zinc oxide (ZnO) | 1.0 |

While this composition includes excessive ZnO in excess of the formulation (3) above, firing at an elevated temperature produces a curve of substantially the same quality as the 1% curve of FIG. 4.

The family of curves set forth in FIG. 5 illustrates the temperature characteristics of a family of dielectric bodies having additives in accordance with the relationship of Formula 2 and specifically the optimum combination set forth in the following table:

TABLE V

| | Curve, percent | | | | | | |
|---|---|---|---|---|---|---|---|
| | 0.5 | 1.0 | 1.5 | 2.0 | 2.5 | 3.0 | 4.0 |
| Ingredient: | | | | | | | |
| $BaTiO_3$ | 89.4 | 87.1 | 84.6 | 82.0 | 79.5 | 77.0 | 71.0 |
| $Bi_2O_3$ | 7.7 | 9.2 | 10.7 | 12.3 | 13.8 | 15.3 | 19.2 |
| $Nb_2O_5$ | 1.5 | 1.7 | 2.0 | 2.3 | 2.6 | 2.9 | 3.6 |
| $TiO_2$ | 0.9 | 1.0 | 1.2 | 1.4 | 1.6 | 1.8 | 2.2 |
| ZnO | 0.5 | 1.0 | 1.5 | 2.0 | 2.5 | 3.0 | 4.0 |

The individual curves are marked in accordance with the amount of ZnO which has been added. However, the other additives have been varied proportionately. All of the samples were fired at 2140° F. in keeping with the ZnO ratio of Formula 2. It will be noted that the curve for the additives including 1% zinc oxide is substantially flat and has a dielectric constant in the order of 1400. Decreasing the amount of ZnO and, consequently the total additives raises the overall dielectric constant while increasing the total additives maintains the flattened characteristic curve but lowers the overall dielectric constant levels. Useful bodies having the benefits of this invention may be produced with as little as .25% and as much as 5% ZnO positive additive with the appropriate amounts (0.5–50%) of the negative additives. The total weight of additives will thus be in the range of 0.75% to 55% by weight of the body. However, at high levels of additives the dielectric constant may be substantially below the 1000 level and thus optimum capacitance and other characteristics are obtained with ZnO additions of up to 2.5% and corresponding amounts of the negative additives.

FIG. 6 illustrates the effect of firing temperature upon one particular body formulated in accordance with the Formula 3. The particular body is that employed in the optimum formulation of FIGS. 1–4, fired at 2220° and 2300° F. Therein it is shown that varying the firing temperature over a significant upper range does not produce significant variations in the shape of the temperature characteristic curve.

Figure 7:
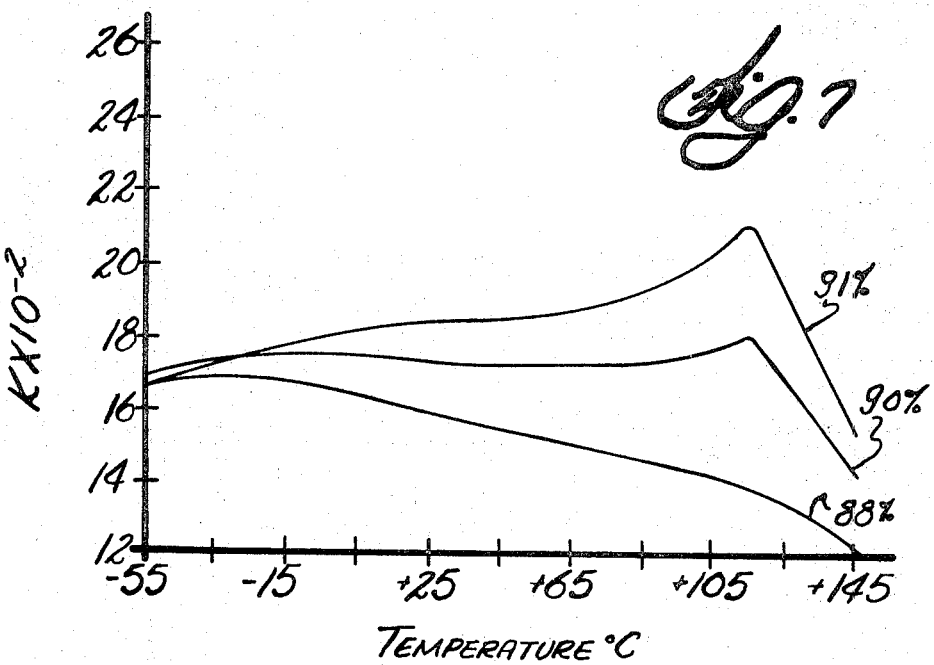
FIG. 7 illustrates the effect of varying the ratio of certain additives in a composition compounded in accordance with this invention.

In FIG. 7 the temperature characteristics of bodies are illustrated having 1% ZnO and varying amounts of the remaining additives of FIGS. 1–4 in the preferred proportions so that the percentage by weight of barium titanate varied between 88 and 91%. The effect of this variation is clear from FIG. 7 where the reduction in the negative additives raised the Curie point at 120° C. while an excessive amount of these additives depresses the curve as shown by the curve 88.

It has been found that there is no necessity for maintaining the stoichiometric ratio between the additives A, Bi and B in the relationship of Formula 1. However, the optimum relationship of the three negative additives should approximate the molecular percentages represented thereby. It has also been established that the product resulting from appropriate processing and proportioning is substantially the same whether the additives are provided in the form of a compound or as individual oxides. The balance between the various oxides taken from the first or negative group depends upon the particular characteristics which are desired. It has been found that $TiO_2$ has only a slight effect upon dielectric constant at room temperature but has a very substantial effect upon the temperature characteristic of dielectric constant as shown by FIG. 3. Similiarly, variations in Bi₂O₃ produce substantially no change in dielectric constant at room temperature and a substantial change in the temperature characteristic of dielectric constant as shown in FIG. 1. The adidtion of Nb₂O₅ produces significant changes in both the temperature characteristic of dielectric constant and the magnitude of dielectric constant at room temperature as shown in FIG. 2. Thus, the balance between the oxides taken from the negative group above is determined by establishing the desired temperature curve and overall dielectric constant and balancing these desirata. For example, a material was prepared having the following formulation:

TABLE VIII

| | Percent |
|---|---|
| Barium titanate (BaTiO₃) | 90.24 |
| Bismuth trioxide (Bi₂O₃) | 7.46 |
| Niobium pentoxide (Nb₂O₅) | 0.87 |
| Titanium dioxide (TiO₂) | 1.43 |
| Zinc oxide (ZnO) | 1.00 |

While the material is about in the range of Formulae 2–3, the stoichiometry has not not been maintained. When this material was fired at temperatures in a range of 2260 to 2340° F. in accordance with conventional practice, a product resulted having a room temperature dielectric constant of 2220. The dielectric constant did not vary from the room temperature value by more than +4% within the temperature range of +10° C. to +125° C. In this example, more than the stoichiometric amount of TiO₂ and less than the stoichiometric amount of Nb₂O₅ have been employed, resulting in a material which has a significantly higher dielectric constant which is stable over a practical range of temperatures.

All of the foregoing data is based upon the addition of ZnO as the positive additive. As discussed above, MgO produces the same effects as ZnO although smaller amounts of the additive by weight are required.

The foregoing specific disclosures illustrate a plurality of dielectric bodies which follow certain basic concepts in order to produce optimum dielectric constants and optimum temperature characteristics over a wide range of manufacturing tolerances. It has been found that by selecting oxides which when added to barium titanate tend to alter the slope of the temperature characteristic curve in a negative direction and appropriately combining them in a predetermined ratio with oxides tending to alter the temperature characterstic curve to provide a more positive slope, an optimum body can be produced with a high dielectric constant and substantially flat temperature characteristics over the useful range while maintaining wide manufacturing tolerances.

One will immediately recognize various additional combinations of oxides and various proportions thereof within the teaching of this description which are not specifically mentioned. One particular bismuth stannate which is known for this use is Bi₂O₃·3SnO₂. Similarly Bi₂O₃·2TiO₂ is a known bismuth titanate and $$2Bi_2O_3 \cdot 3ZrO_2$$

is a known Bismuth Zirconate. Also, many combinations can be generated in accordance with Formula 1 above, which may also be expressed as:

$$n(aA_2O \cdot bBO \cdot cC_2O_3 \cdot dDO_2 \cdot eE_2O_5)$$

where $n$ is an integer; the coefficients are taken from the following groups: $a=0.5$, $b=0$, $c=2.5$, $d=0$, $e=2$; $a=0$, $b=1$, $c=1$, $d=0$, $e=1$; and $a=0$, $b=0$, $c=1.5$, $d=1$, $e=0.5$; and the oxides are taken from the following groups: A—Na, K; B—Ba, Ca, Sr, Pb, Cd; C—Bi, Sb; D—Ti, Zr, Sn; E—Ta, Nb.

While certain advantages result from using very small amounts of the additives as taught herein, in general, the disclosed invention with balanced additives will not be fully utilized with total additives less than about 4%.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined and secured by the following claims.

What is claimed is:

1. A ceramic dielectric composition consisting essentially of BaTiO₃ with additions in the range of about 0.75 to 55% by weight of ZnO and a combination of Bi₂O₃, Nb₂O₅ and TiO₂, said combination approximating the relationship Bi₃NbTiO₉, the amount of ZnO being within the range of about 0.25 to about 5%, the relationship between the amount of ZnO and the amount of said combination in said composition being about in the range $y=0.25$ $(x-8)$ to $y=0.5$ $(x-8)$ where $y$ is the amount of ZnO and $x$ is the amount of said combination.

2. The ceramic dielectric composition of claim 1 wherein the amount of said ZnO is within the range of about 0.5 to about 4.0%.

3. A ceramic dielectric composition consisting essentially of BaTiO₃ and additions in the range of about 0.75 to 55% by weight of positive additive material and negative additive materials, the positive additive material being selected from the group consisting of ZnO and MgO and being present in an amount of between about 0.25 and about 5% by weight, the negative additive material being selected from the group which approximates the composition $$n(aA_2O \cdot bBO \cdot cC_2O_3 \cdot dDO_2 \cdot eE_2O_5)$$

where $n$ is an integer; the coefficients are taken from the following groups: $a=0.5$, $b=0$, $c=2.5$, $d=0$, $e=2$; $a=0$, $b=1$, $c=1$, $d=0$, $e=1$; and $a=0$, $b=0$, $c=1.5$, $d=1$, $e=0.5$; and the oxides are taken from the following groups: A—Na, K; B—Ba, Ca, Sr, Pb, Cd; C—Bi, Sb; D—Ti, Zr, Sn; E—Ta, Nb.

4. A ceramic dielectric composition consisting essentially of BaTiO₃ with additions in the range of about 0.75 to 55% by weight of a material selected from the group consisting of ZnO and MgO and a combination of Bi₂O₃, Nb₂O₅ and TiO₂, the amount of said material being in the range of 0.25 and 5.0% and the amount of said combination being directly related to the amount of said material and the combination approximating the relationship Bi₃NbTiO₉ whereby the curve of dielectric constant versus ambient temperature is approximately flat over the temperature range of about −55° C. to +125° C.

5. A ceramic dielectric composition consisting essentially of from about 70 to about 95.25% BaTiO₃, from about 4 to about 19.2% Bi₂O₃, from about 0.5 to about 3.6% Nb₂O₅, from 0 to about 2.2% TiO₂, and from about 0.25 to about 5% of a positive additive material selected from the group consisting of ZnO and MgO.

6. The ceramic dielectric composition of claim 5 wherein said Bi₂O₃ is present in an amount of at least about 7.7%, said Nb₂O₅ is present in an amount of at least about 1.5%, said TiO₂ is present in an amount of at least about 0.5%, and said positive additive material is present in an amount of at least 0.5%, said composition exhibiting a curve of dielectric constant versus ambient temperature which is approximately flat over the temperature range of about −55°C. to about +125° C.

7. The ceramic dielectric composition of claim 5 wherein the positive additive material is ZnO.

8. The ceramic dielectric composition of claim 6 wherein the ZnO is present in an amount of about 1%.

9. The ceramic dielectric composition of claim 6 wherein said BaTiO₃ is present in an amount of about 88.9%, said Bi₂O₃ is present in an amount of about 7.7%, said Nb₂O₅ is present in an amount of about 1.5%, said TiO₂ is present in an amount of about 0.9%, and said ZnO is present in an amount of about 1.0%.

(References on following page)

References Cited

UNITED STATES PATENTS

| | | | |
|---|---|---|---|
| 2,643,192 | 6/1953 | Jonker et al. | 106—39 |
| 2,668,118 | 2/1954 | Jonker | 106—39 |
| 2,695,240 | 11/1954 | Oshry | 106—39 |
| 2,992,929 | 7/1961 | Clement et al. | 106—39 |
| 3,069,275 | 12/1962 | Goodman | 106—39 |
| 3,117,094 | 1/1964 | Roup et al. | 252—62.9 |

FOREIGN PATENTS 755,860  8/1956  Great Britain.

OTHER REFERENCES

Heywang, W., "Resistivity Anomaly in Doped Banain Titanate," in Journ. Amer. Cer. Soc., 47; 1964 p. 484.

HELEN M. McCARTHY, Primary Examiner

W. R. SATTERFIELD, Assistant Examiner

U.S. Cl. X.R.

106—46; 252—6.35, 521